US006901773B2

(12) United States Patent
Thomas et al.

(10) Patent No.: US 6,901,773 B2
(45) Date of Patent: Jun. 7, 2005

(54) SEMI-CONVECTIVE FORCED AIR SYSTEM HAVING AMPLIFIED AIR NOZZLES FOR HEATING LOW "E" COATED GLASS

(75) Inventors: Ernie Thomas, Cherry Hill, NJ (US); Lawrence Betz, Pitman, NJ (US)

(73) Assignee: Tamglass Ltd. OY, Tampere (FI)

( * ) Notice: Subject to any disclaimer, the term of this patent is extended or adjusted under 35 U.S.C. 154(b) by 124 days.

(21) Appl. No.: 09/917,598

(22) Filed: Jul. 27, 2001

(65) Prior Publication Data

US 2003/0019244 A1 Jan. 30, 2003

(51) Int. Cl.[7] .............................................. C03B 25/00
(52) U.S. Cl. ............................ 65/118; 65/119; 65/355; 65/356; 65/348; 432/114; 432/145; 239/589; 239/600
(58) Field of Search ........................ 65/118, 119, 355, 65/356, 348; 432/144, 145; 239/589–600

(56) References Cited

U.S. PATENT DOCUMENTS

| | | | |
|---|---|---|---|
| 2,073,144 A | 3/1937 | Darrah | |
| 3,208,740 A | 9/1965 | Nesbitt et al. | |
| 3,249,415 A | 5/1966 | McMaster et al. | |
| 3,488,173 A | 1/1970 | McMaster | |
| 3,607,173 A | 9/1971 | Joehlin | |
| 4,059,427 A | 11/1977 | Starr | |
| 4,390,359 A | * 6/1983 | Reunamaki | 65/114 |
| 4,400,194 A | 8/1983 | Starr | |
| 4,505,671 A | 3/1985 | McMaster | |
| 4,529,380 A | 7/1985 | McMaster | |
| 4,738,705 A | 4/1988 | McMaster | |
| 4,888,038 A | 12/1989 | Herrington et al. | |
| 5,009,693 A | 4/1991 | Freidel et al. | |
| 5,039,841 A | 8/1991 | Kato et al. | |
| 5,110,338 A | 5/1992 | McMaster | |
| 5,118,942 A | 6/1992 | Hamade | |
| 5,125,948 A | 6/1992 | Vanaschen et al. | |
| 5,147,439 A | * 9/1992 | Ritz | 65/158 |
| 5,368,624 A | 11/1994 | Lehto et al. | |
| 5,620,492 A | 4/1997 | Land | |
| 5,951,734 A | * 9/1999 | Friedel et al. | 65/118 |

FOREIGN PATENT DOCUMENTS

| | | |
|---|---|---|
| DE | 1471831 | 3/1970 |
| EP | 0 058 529 | 8/1982 |
| EP | 0 265 787 A1 | 5/1988 |
| EP | 0 564 489 B1 | 7/1992 |

* cited by examiner

Primary Examiner—Mark Halpern
(74) Attorney, Agent, or Firm—John F. A. Earley; John F. A. Earley, III; Harding, Earley, Follmer, Frailey

(57) ABSTRACT

A semi-convective forced air system for heating glass sheets during a heating cycle comprises a heating chamber having a length and a width, at least one heating element located within the heating chamber, a conveyor having a length and a width, the conveyor extending lengthwise through the heating chamber, a compressed air source, a plurality of air manifolds positioned within the heating chamber and in fluid connection with the compressed air source, each of the air manifolds having a length, and each of the air manifolds being oriented parallel to the length of the conveyor, and a plurality of nozzles mounted on each air manifold and in fluid connection with the air manifold for mixing together and directing toward the conveyor a combination of compressed air and over air to convectively heat a sheet of glass on the conveyor, the plurality of nozzles on each air manifold being spaced along the length of the air manifold.

26 Claims, 9 Drawing Sheets direction of Glass Flow

SEMI-CONVECTIVE FORCED AIR SYSTEM HAVING AMPLIFIED AIR NOZZLES FOR HEATING LOW "E" COATED GLASS

FIELD OF THE INVENTION

The present invention relates to a semi-convective forced air system and method for heating glass sheets for subsequent processing. More particularly, the system and method of the present invention are used for heating low emissivity coated glass (low "e" glass) before tempering.

BACKGROUND OF THE INVENTION

Forced air furnaces for heating glass sheets in preparation for subsequent processing, such as tempering, are known in the art. For example, McMaster U.S. Pat. Nos. 4,529,380 and 4,505,671 disclose a glass sheet processing system which includes a heating furnace and a processing station for processing heated glass sheets to provide bending, tempering, bending and tempering, filming, etc. The furnace of U.S. Pat. Nos. 4,592,380 and 4,505,671 comprises an array of gas jets spaced above a conveyor within a heating chamber. The gas jets supply a primary gas flow directed toward the conveyor to provide forced convection heating of the glass sheets as the sheets are conveyed through the heating chamber. The gas jets of McMaster are arranged in linear series perpendicular to the length of the conveyor and the direction of travel of the glass sheets. Each series of jets is connected to a common linear supply manifold or conduit. Each supply conduit also extends widthwise in the heating furnace, perpendicular to the length of the conveyor. McMaster teaches that the array of gas jet pumps are spaced from each other transversely to the direction of conveyance so as to uniformly heat each conveyed glass sheet over its entire width.

Heating systems such as that described by McMaster appear to provide acceptable results for heating clear glass prior to tempering. Other known systems provide acceptable results for heating coated glass having an emissivity rating greater than about 0.2 prior to tempering. However, manufacturers have now begun to produce coated glass products having emissivity ratings in the range of 0.15–0.04. Prior art heating systems, including the system disclosed in U.S. Pat. Nos. 4,592,380 and 4,505,671, do not provide acceptable results for tempering glass having such low emissivity ratings.

Tamglass U.S. Pat. No. 5,951,734 discloses a system for heating low "e" glass sheeting, particularly low "e" glass sheeting having an emissivity rating below 0.2. One of the advantages provided by the heating system disclosed in Tamglass U.S. Pat. No. 5,951,734 is that it minimizes the problem of "oil-canning" and "bubbling" in glass sheeting caused by not heating the glass sheets uniformly.

Although the heating system disclosed in Tamglass U.S. Pat. No. 5,951,734 provides excellent results, it requires longer heating times to heat low "e" glass to the required temperature than the heating times required to heat non-coated glass. Therefore, it would be desirable to provide a system for heating low "e" glass which requires heating times that are shorter than the heating times required in the heating system of Tamglass U.S. Pat. No. 5,951,734 for heating low "e" glass to the required temperature.

Although heating systems that use nozzles to mix hot oven air and compressed air are known, these structures have been unsuccessful for heating low "e" glass. The nozzles of these prior systems produce a very small area of concentrated air flow, which damages the coating on the glass.

SUMMARY OF THE INVENTION

It is an object of the invention to provide a semi-convective forced air system for heating glass sheets during a heating cycle for subsequent processing such as tempering.

Another object of the invention is to provide a semi-convective forced air system that is useful for heating low emissivity coated glass sheeting, including low emissivity coated glass sheeting having an emissivity rating below 0.2.

Another object of the invention is to provide a semi-convective forced air system for heating low emissivity coated glass sheeting which requires heating times that are shorter than the heating times required in the heating system disclosed in Tamglass U.S. Pat. No. 5,951,734 for heating low emissivity coated glass sheeting.

These and other advantages are obtained by our invention, which is set out below. Our invention includes (1) a semi-convective forced air system for heating glass sheets, including low emissivity coated glass sheeting in general, as well as low emissivity coated glass sheeting having an emissivity rating below 0.2, during a heating cycle for subsequent processing such as tempering, (2) a method of heating glass sheets, including low emissivity coated glass sheeting in general, as well as low emissivity coated glass sheeting having an emissivity rating below 0.2, using a semi-convective forced air system during a heating cycle for subsequent processing such as tempering, and (3) a nozzle or air injector used in the inventive semi-convective forced air system for mixing and directing a combination of compressed air and oven air toward a glass sheet to convectively heat the glass sheet.

DETAILED DESCRIPTION

Figure 1:
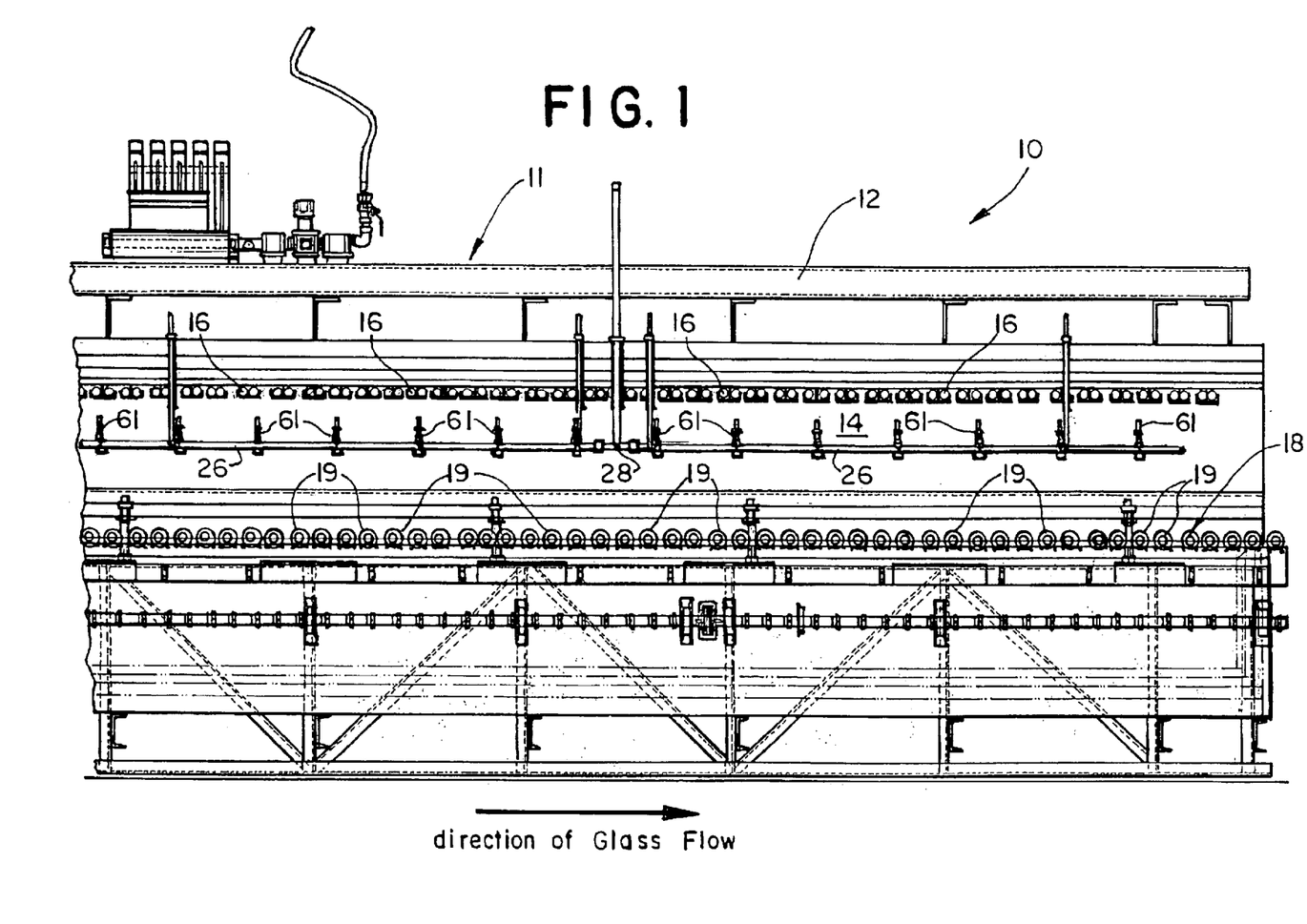
FIG. 1 is a view in cross-section of a semi-convective forced air system constructed in accordance with a preferred embodiment of the invention.
Figure 2:
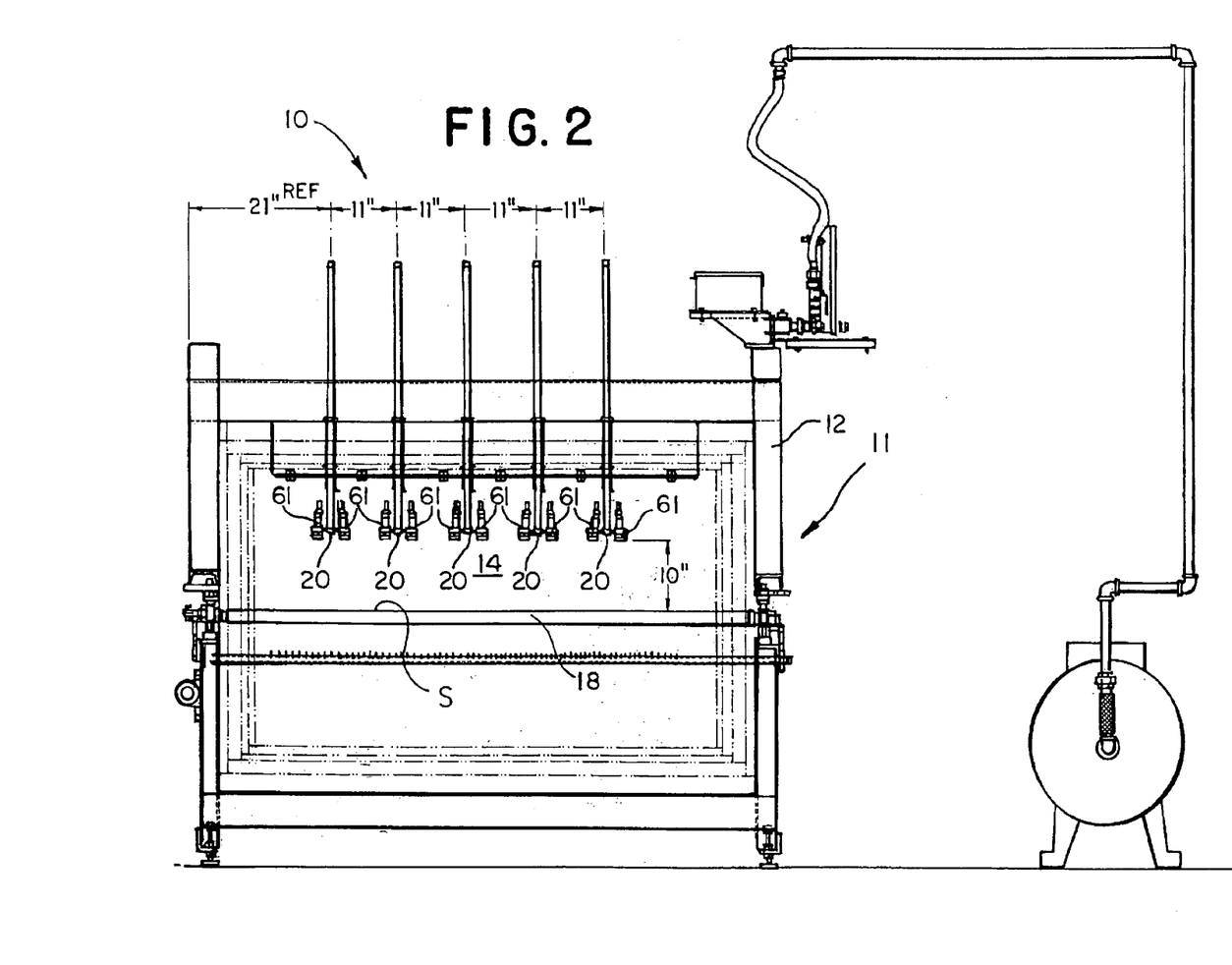
FIG. 2 is a side elevational view of the system shown in FIG. 1.

Turning to the drawings, there is shown our inventive semi-convective forced air system 10, which is similar in many respects to the semi-convective forced air system shown in Tamglass U.S. Pat. No. 5,951,734, which is incorporated herein by reference. The system 10 comprises a furnace or oven 11 having a furnace housing 12, the construction of which is known in the art as taught, for example, by Tamglass U.S. Pat. No. 4,390,359, which is incorporated herein by reference. The furnace housing 12 is preferably made of a heat resistant ceramic material. Like the system of Tamglass U.S. Pat. No. 5,951,734, the furnace 11 includes a heating chamber 14 in which glass sheets S are heated during a heating cycle in preparation for subsequent processing such as tempering, bending, filming, etc. The furnace 11 includes heating elements 16, such as gas or electric heating elements, on the top and bottom of the heating chamber 14 which provide radiant heat to a work piece located therein.

Figure 3:
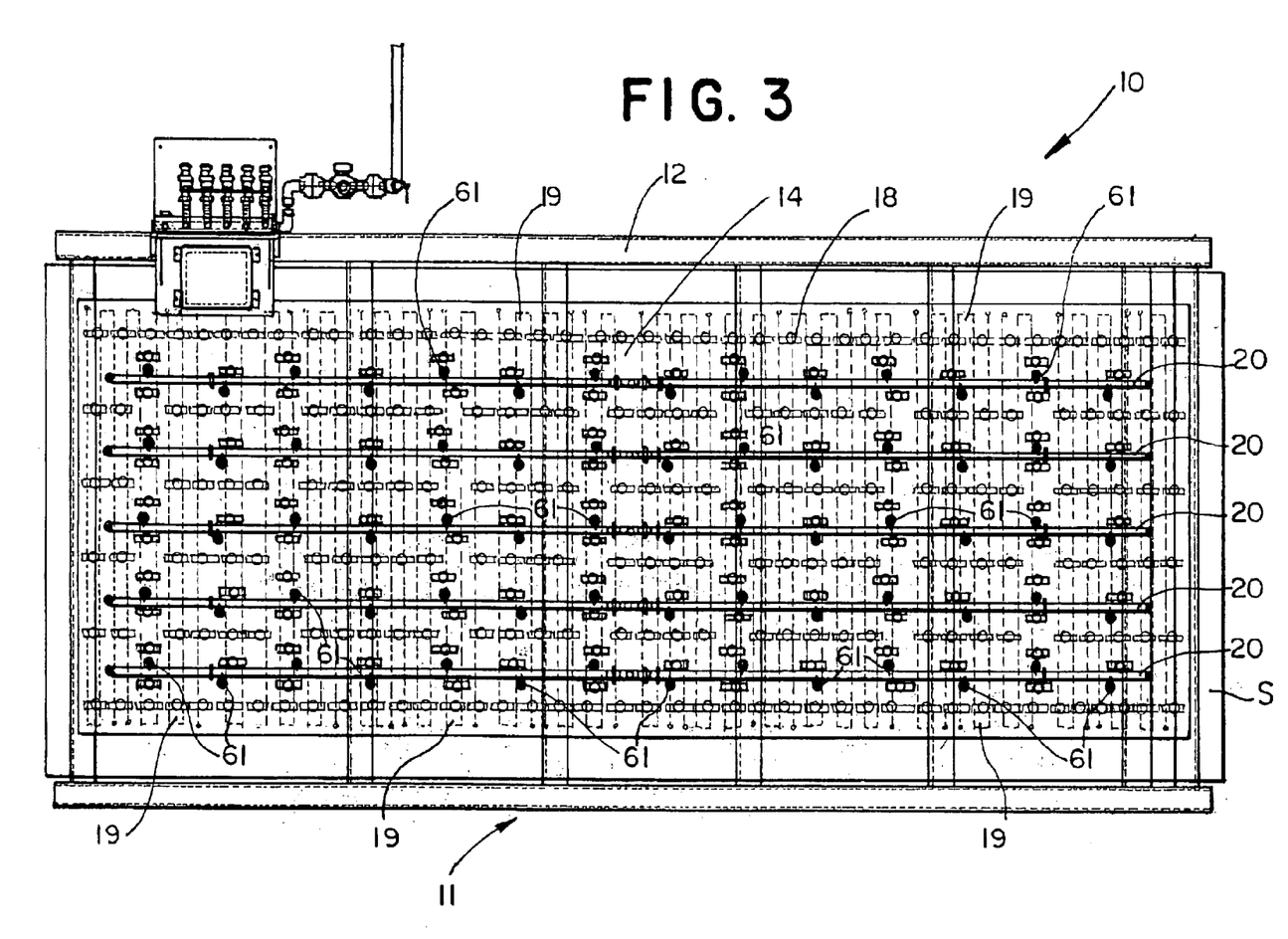
FIG. 3 is a view in top plan of the furnace 11 shown in FIGS. 1 and 2 with the top wall of the heating chamber 14 not shown which shows the air manifolds 20, the nozzles 61 mounted thereon, and the conveyor 18.
Figure 4:
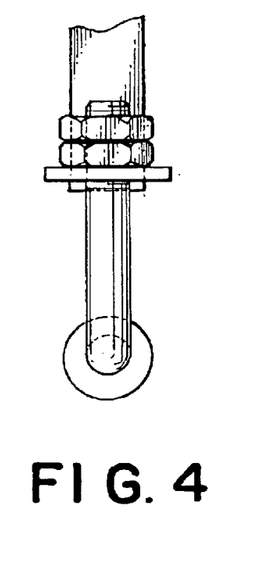
FIG. 4 is view in elevation showing a support for an air manifold 20.

A conveyor 18 extends lengthwise through the heating chamber 14. The conveyor 18 preferably includes a series of rotatably fixed horizontally extending rolls 19 which are driven in unison to convey a work piece, such as glass sheeting S, through the chamber 14. A conveyor 18 of this type is well known in the art as taught, for example, by Tamglass U.S. Pat. No. 4,390,359. Like the system of Tamglass U.S. Pat. No. 5,951,734, our new system 10 in a preferred embodiment has a plurality of air manifolds 20 mounted above the conveyor 18 within the heating chamber 14 and connected in fluid communication with a compressed air source 22 preferably located outside the heating chamber 14. The air manifolds 20 are arranged parallel to the length of the conveyor 18.

The compressed air source 22 preferably includes a compressor 23 which is capable of supplying about 17 CFM at about 50 psi, which is the equivalent of about a 10 H.P. compressor for the largest system. The air source also preferably includes a 120 gallon stationary air tank 25. The stationary tank 25 may have an automatic bottom drain 27 which relieves oil and water build-up from the tank 25.

In a preferred embodiment of the invention, each air manifold 20 comprises a pair of elongate tubes 26 connected at one end by a hollow "T" connector 28. The other ends of the elongate tubes 26 are sealed with a cap, plug, or other means.

Figure 5:
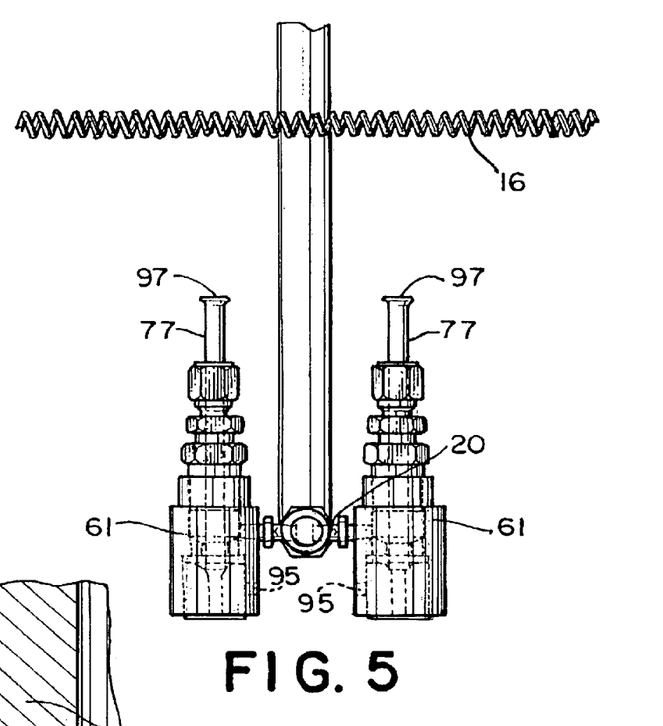
FIG. 5 is a view in partial cross-section showing nozzles 61 mounted on an air manifold.
Figure 6:
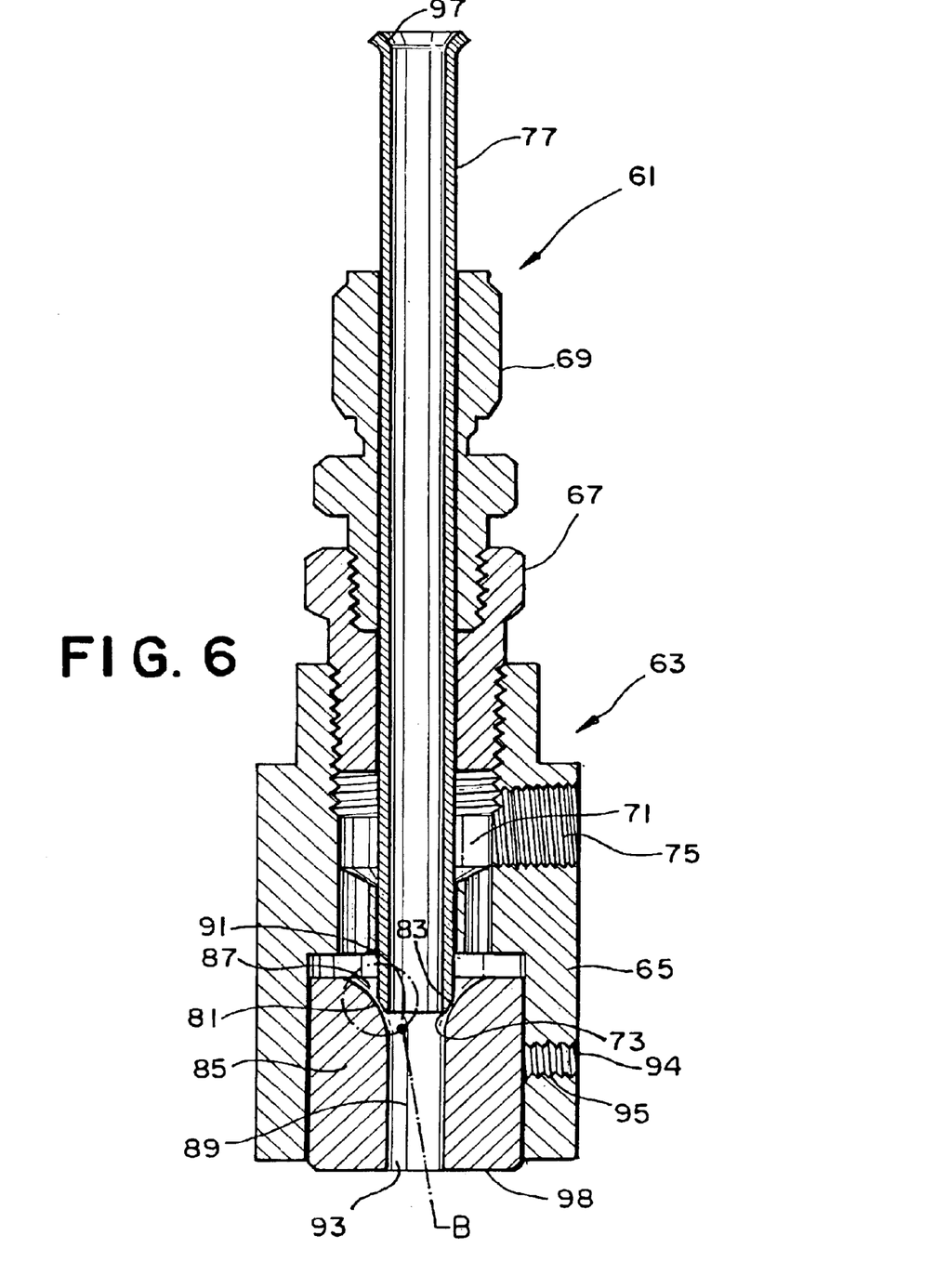
FIG. 6 is a cross-sectional view of a nozzle 61.

A plurality of nozzles or air injectors 61 are mounted on each air manifold 20 such that they are in fluid communication with the air manifold 20. Nozzle 61 mixes and directs a combination of compressed air and oven air toward the conveyor 18 to convectively heat a sheet S of glass on the conveyor 18. This supplements the radiant heat provided by the heating elements 16.

The plurality of nozzles 61 on each air manifold 20 are spaced along the length of the air manifold 20, and as shown in the drawings, the nozzles 61 on each air manifold 20 are preferably alternately positioned on opposite sides of the air manifold 20.

In the preferred embodiment shown in the drawings, nozzle 61 has a body 63 comprising a base portion 65 which is connected in series to two extension portions 67 and 69. A compressed air chamber 71 is formed in the body 63, and the compressed air chamber has an outlet port 73. A compressed air inlet means 75 is formed in the body for introducing compressed air into the compressed air chamber 71. The nozzle 61 also includes oven air conduit means or tube 77 that, in the preferred embodiment of the invention shown in the drawings, extends through the body 63 and the compressed air chamber 71 to a location 79 immediately proximate to and downstream of the outlet port 73 of the compressed air chamber 71.

Figure 9:
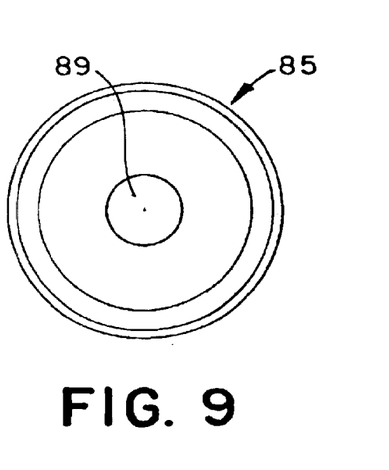
FIG. 9 is a view in bottom plan of the insert piece 85.

The outlet port 73 of the compressed air chamber 71 is formed by a gap 81 that extends annularly around the outlet end portion 83 of the tube 77 and is located between the outlet end portion 83 of the tube 77 and an insert piece 85 that is mounted in an opening 87 formed in the lower end portion of the nozzle body 63. The insert piece 85 has a bore 89 extending downwardly therethrough for receiving compressed air from the outlet port 73 of the compressed air chamber 71 and oven air from the tube 77. The bore 89 has a first end portion 91 into which compressed air enters from the compressed air chamber 71 through the outlet port 73 of the compressed air chamber 71 and oven air enters from the tube 77 through the outlet end portion 83 of the tube 77, and the bore 89 has a second end portion 93 from which the compressed air and the oven air that enters the bore 89 exits the nozzle 61. After the insert piece 85 is positioned properly in the opening 87 formed in the nozzle body 63 such that the desired width of the gap 81 is obtained, the insert piece 85 is secured in place in the opening 87 with a screw 94 that extends through a threaded hole 95 in the nozzle body 63.

Figure 10:
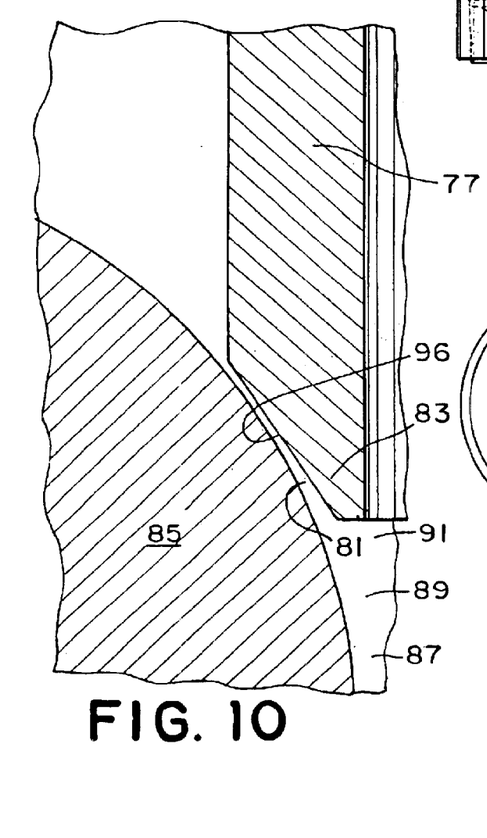
FIG. 10 is a enlarged view highlighting what is shown in the circle B of FIG. 6.

As best shown in FIG. 10, the tube 77 at its outlet end portion 83 is angled inwardly to form an inwardly angled outer surface portion 96 that is aligned next to the outwardly flaring first end portion 91 of the bore 89 to define the gap 81. Preferably, the width of the gap 81 is between about 0.006 inches and about 0.009 inches.

Preferably, the tube 77 for each nozzle 61 has a length sufficiently long such that the inlet end portion 97 of the tube 77 is located closely to the oven air near a heating element to enable such oven air to be drawn into the tube 77 when the nozzle 61 is in use in the oven.

In a preferred embodiment of the invention, the inlet end portion 97 of the tube 77 of each nozzle 61 is positioned about 1 to 2 inches from the vicinity of the heating elements 16, and the second end portion 98 of the insert piece 85 is located about 6 to 10 inches above the sheet(s) of glass, with 10 inches being most preferred.

Each air manifold 20 includes a supply tube 32 which is connected at one end to the third port of the "T" connector 28 and at the other end to a distribution manifold 34. The distribution manifold 34 is arranged in fluid connection with the compressed air source 22 and distributes compressed air to each of the air manifolds 20.

Figure 7:
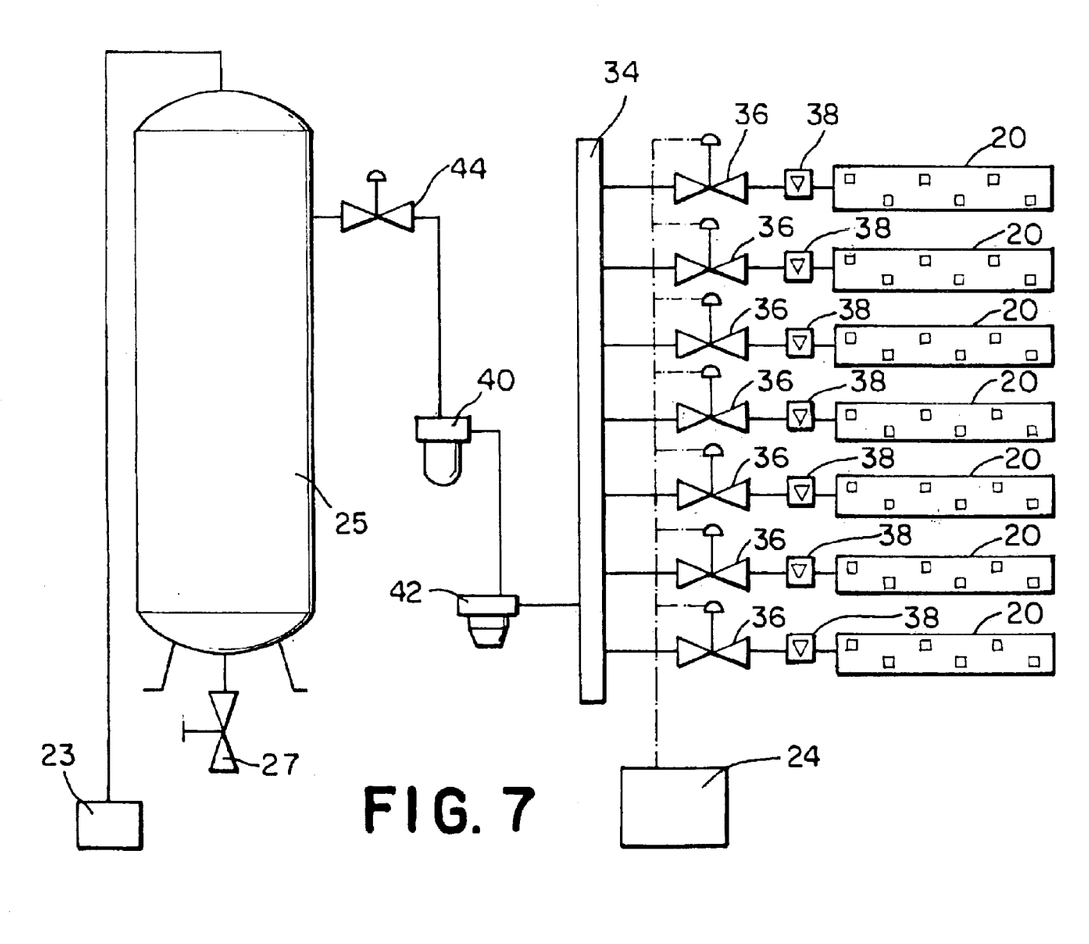
FIG. 7 is a schematic illustration of the control system in accordance with an embodiment of the invention.

The system 10 includes a controller 24 which controls the flow of air through each of the plurality of air manifolds 20. The controller 24 selectively restricts or allows a flow of compressed air to each of the air manifolds 20, or rows of manifolds, at predetermined times during the heating cycle to control the heating process and minimize oil canning and bubbling in the glass sheets.

A solenoid valve 36 and a flow meter 38 are arranged in fluid connection between the distribution manifold 34 and each of the air manifolds 20. Each solenoid valve 36 is connected to the controller 24 which selectively opens and closes each solenoid valve 36 at different times during a heating cycle. Each flow meter 38 monitors the volume of air entering the respective air manifolds 20 and is provided with a pressure regulator to set the upper limit of air flow. Preferably, each flow meter 38 comprises a Dwyer Rate Master Flowmeter, model No. RMC-104-BV having ½ NPT connections and is set at a flow rate of 200 standard cubic feet per hour. Preferably, the solenoid valves comprise Asco two way solenoid valves, model No. 8210C94 having ½ NPT connections and ⅝" orifice with a maximum operating pressure differential of 100 psi. The controller 24 is preferably a programmable logic computer which is well known in the art.

A filter/dryer 40, air regulator 42, and solenoid valve 44 are arranged in fluid connection intermediate the compressed air source 22 and the distribution manifold 34. Preferably the filter/dryer 40 comprises a 40 micron filter manufactured by ARO, part number F25242-111 and a coalescing filter manufactured by ARO, part number F25242-311; the air regulator is preferably manufactured by ARO, part number R27241-100 and the pressure gauge is manufactured by ARO, part number 100067; and, the solenoid valve 44 is manufactured by Burkert, part number 453058.

Preferably, the air manifolds 20 having a plurality of nozzles 61 mounted thereon are arranged in banks comprising at least one air manifold 20. FIG. 2 illustrates a preferred embodiment of the invention which comprises one bank of air manifolds 20, and the bank shown in FIG. 2 comprises five rows of air manifolds 20.

Figure 8A:
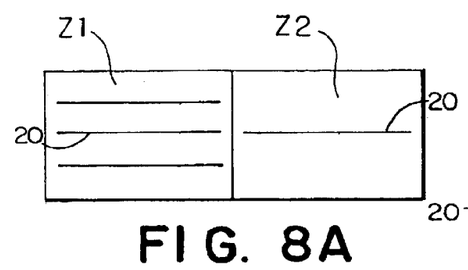
FIGS. 8a–d are schematic illustrations of arrangements of air manifolds shown relative to glass sheets in a two-zone oven in accordance with a further embodiment of the invention.
Figure 8B:
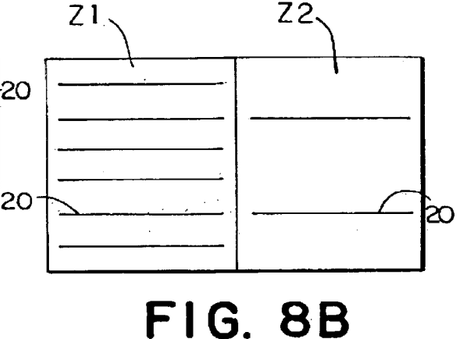
Figure 8C:
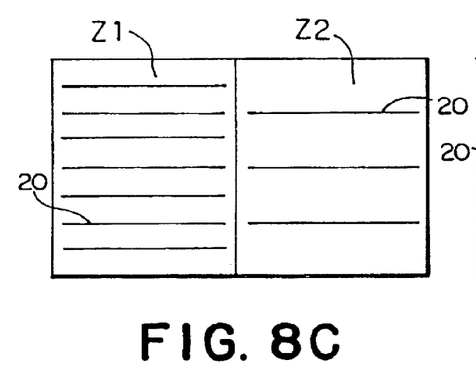
Figure 8D:
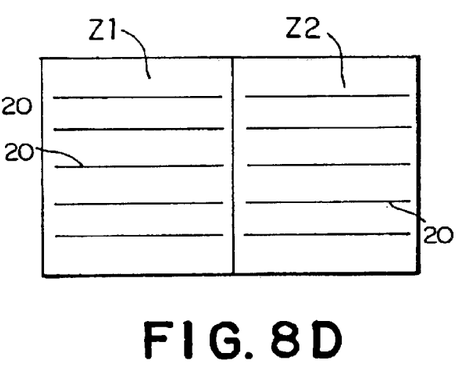

FIGS. 8A, 8B, 8C, and 8D illustrate schematically several of many alternative preferred embodiments. In FIG. 8A, the air manifolds 20 are arranged in two banks to form a two zone furnace having a first zone Z1 and a second zone Z2. The first bank of air manifolds 20 located in zone Z1 of the furnace of FIG. 8A has three rows of air manifolds 20, and the second zone Z2 has a bank of one air manifold row. FIG. 8B shows six rows of air manifolds 20 in the bank of manifolds located in zone Z1 and a bank of two rows of air manifolds 20 located in Z2 of the furnace. FIG. 8C shows a bank of seven rows of air manifolds 20 positioned in zone Z1 and a bank of three air manifolds 20 in zone Z2. FIG. 8D shows a bank of 5 rows of air manifolds 20 in zone Z1 and a matching bank of 5 rows of air manifolds 20 in zone Z2. In furnaces having more than one heating zone, it is most preferred to provide a bank of manifolds 20 having the same number of rows of manifolds 20 to each zone.

Figure 13:
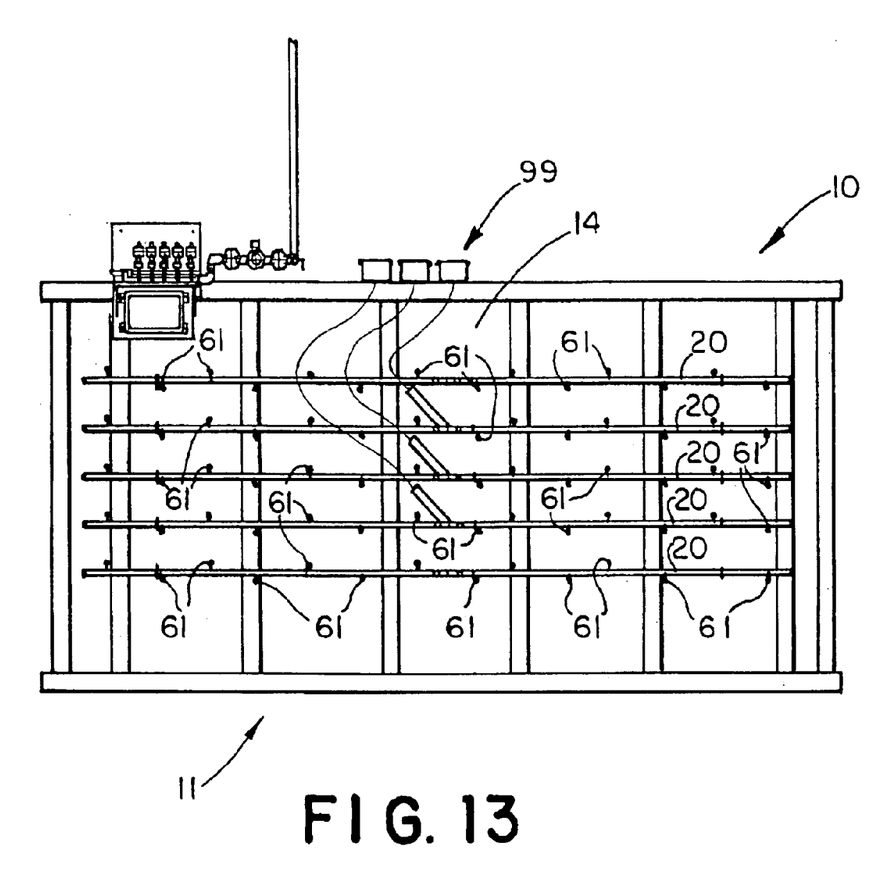
FIG. 13 shows an alternative embodiment of the invention in which heating means are provided for heating compressed air.

In an alternative embodiment of the invention, as shown in FIG. 13, the compressed air may be heated using heating means 99 for heating the compressed air prior to entry into the air manifolds 20.

Figure 11:
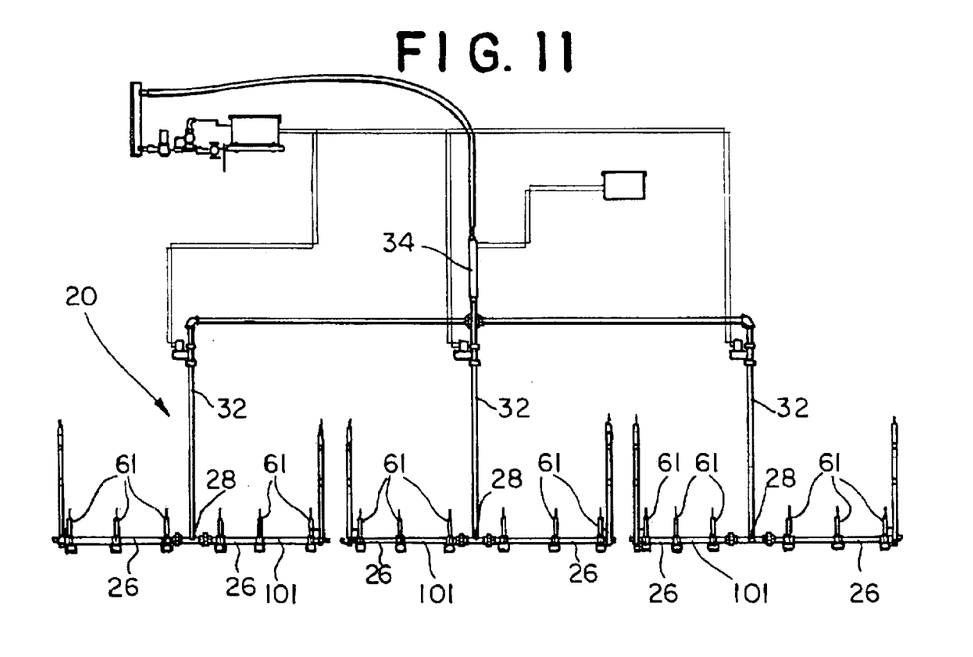
FIG. 11 shows a view in elevation of a segmented air manifold of an alternative embodiment of the invention.
Figure 12:
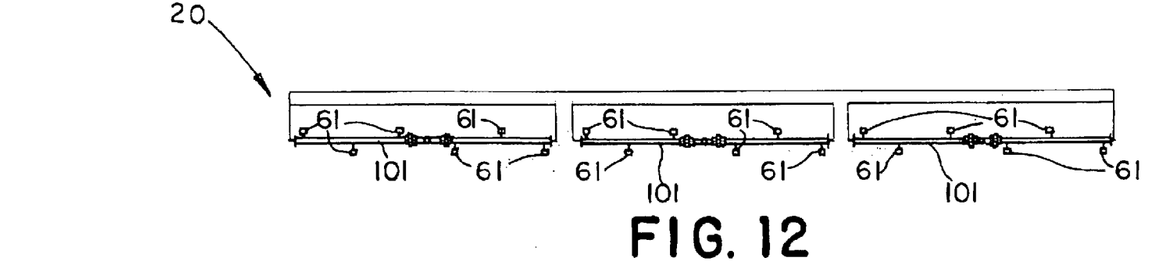
FIG. 12 shows a view in top plan of the segmented air manifold of FIG. 11.

Also, in an alternative embodiment of the invention, as shown in FIGS. 11 and 12, the air manifolds 20 may be segmented into segments 101, with each segment 101 being connected to the compressed air source 22 via a supply tube 32 connected to the distribution manifold 34. Said segmented manifolds 101 provide the option of firing each segment 101 independently of the others, which allows for more uniform heating of the glass sheet S by firing the air only when the glass sheet S is below a segment 101. In normal operation, the leading and trailing edges of the glass sheet S are hotter than the center of the glass sheet S because the rolls 19 at the leading and trailing edges of the glass sheet S reheat as it moves over rolls 19 that are not covered by the glass sheet S as it oscillates on the conveyor 18. The rolls 19 near the center of the glass sheet S cool down because the glass sheet S is always in contact with these rolls 19 as the glass sheet S oscillates back and forth on the conveyor 18. By shutting off the air to locations under segments 101 when the glass sheet S is not located under such segments 101, the invention minimizes the risk of over-heating the rolls 19 by convention heating and the invention minimizes compressed air consumption.

In another alternative embodiment of the invention, one or more banks of manifolds 20, the manifolds 20 of which having a plurality of nozzles 61 mounted thereon, also may be positioned in the heating chamber 14 below the conveyor 14 in a manner similar to the positioning of the bank or banks of manifolds 20 having the plurality of nozzles 61 mounted thereon that are positioned above the conveyor 18, except that the nozzles 61 positioned below the conveyor 14 are positioned to direct the combination of oven air and compressed air therefrom upwardly toward the conveyor 14.

The system may be used in a batch type furnace or in a continuous furnace during the heating. In a continuous furnace, the air manifolds 20 would not extend over the full length of the continuous system.

In use, the entire length of selected widthwise portions of the glass sheet S may be convectively heated in a specific sequence by controlling the flow of air to selected air manifolds 20.

In use, a sheet S of glass, which may be a low emissivity coated glass, to be heated in preparation for subsequent processing, such as tempering, is loaded onto the conveyor 18 and oriented such that the lengthwise edge of the glass sheet S is parallel to the length of the conveyor 18. The glass sheet S is then conveyed by the conveyor 18 into the heating chamber 14 of the furnace 11, where it is convectively heated over entire lengths of selected widthwise portions of the glass sheet S by creating a flow of heated air onto the selected widthwise portions of the glass sheet S using a plurality of nozzles 61 which are mounted in the heating chamber 14 of the furnace 11. The nozzles 61 mix and direct a combination of compressed air and oven air onto the glass sheet S. Oven air is drawn into and through the tube 77 and then into the bore 89 in the insert piece 85 in response to compressed air moving through the gap 81, which is formed between the outlet end portion 83 of the tube 77 and the insert piece 85 mounted in the opening 87 formed in the lower end portion of the nozzle body 63, and into the bore 89, is mixed with the compressed air in the bore 89, and is expelled from the nozzle 61 from the second end portion 93 of the bore 89.

Preferably, the oven air is being drawn by the nozzle 61 from a location close to a heating element 16 in the heating chamber 14.

ADVANTAGES

In accordance with the system and method of the present invention, heat is uniformly applied over the entire length of selected widthwise portions of the glass sheet to reduce or eliminate oil canning and bubbling.

Our inventive nozzle 61 reduces the need for outside heaters for heating the compressed air since our inventive nozzle permits the use of about 6 times more oven air for use in convection heating as compared to prior art furances that use nozzles. Accordingly, our new invention permits the circulation of more air by using less ingested compressed air because the nozzles 61 act as an amplifier to pull in about 6 times more oven air than prior art nozzles. So where old nozzles produce one cfm, our new nozzle constructed in accordance with the invention produces 5 times that but with only one cfm going into it. Accordingly, we are getting 5 cfm worth of heated air down to the surface of the glass sheet S as compared to only 1 cfm worth of heated air produced by the prior art nozzles.

Once the nozzles of the invention are heated up to operational temperatures, a change in temperature of plus or minus 50 degrees does not really effect the way that the nozzle works, which is an advantage over prior art nozzles which seem to be more affected by temperature variations.

What is claimed is:

1. A semi-convective forced air system for heating glass sheets during a heating cycle, comprising:

a heating chamber having a length and a width, at least one heating element located within the heating chamber, a conveyor having a length and a width, the conveyor extending lengthwise through the heating chamber, a compressed air source, a plurality of air manifolds positioned within the heating chamber and in fluid connection with the compressed air source, each of the air manifolds having a length, and each of the air manifolds being oriented parallel to the length of the conveyor, and a plurality of nozzle means mounted on each air manifold and in fluid connection with the air manifold for mixing together and directing toward the conveyor a combination of compressed air and oven air to convectively heat a sheet of glass on the conveyor, the plurality of nozzle means on each air manifold being spaced along the length of the air manifold, each nozzle means comprising a conduit for drawing in oven air, and an outlet port, wherein said oven air and said compressed air are combined in said nozzle means prior to exiting said outlet port.

2. The system of claim 1, the air manifolds being arranged in at least one widthwise-extending column.

3. The system of claim 1, the air manifolds being arranged in a side-by-side fashion in a horizontal plane above the conveyor.

4. The system of claim 1, each manifold being segmented into a plurality of segments, with each segment being connected to the compressed air source, with each segment being oriented parallel to the length of the conveyor, and with each segment having at least one nozzle means mounted therein.

5. The system of claim 4, further including a distribution manifold in fluid connection with the compressed air source and each manifold segment, a valve and a flow meter in fluid connection with the distribution manifold, and a controller connected to the compressed air source for controlling how much compressed air is supplied to selected manifold segments at predetermined times during a heating cycle.

6. The system of claim 5, the controller being a computer programmable to open and close the valve at predetermined times during a heating cycle.

7. The system of claim 1, said air manifolds being arranged in a first bank, and further including at least one additional bank of air manifolds positioned within the heating chamber and in fluid connection with the compressed air source, each air manifold in the at least one additional bank of manifolds having a length and being oriented parallel to the length of the conveyor, and a plurality of nozzle means mounted on and in fluid connection with each air manifold in the at least one additional bank of air manifolds for directing a combination of compressed air and oven air toward the conveyor to convectively heat a sheet of glass on the conveyor, the plurality of nozzle means on each air manifold in the at least one additional bank of air manifolds being spaced along the length of each air manifold in the at least one additional bank of air manifolds.

8. The system of claim 1, the plurality of nozzle means on each air manifold being spaced in a series along the length of the air manifold with each adjacent nozzle means being mounted on opposite sides of the air manifold.

9. The system of claim 1, further including a distribution manifold in fluid connection with compressed air source and each air manifold.

10. The system of claim 9, further including a valve in fluid connection with the distribution manifold, and a controller connected to the valve for controlling how much compressed air is supplied to selected manifolds at predetermined times during a heating cycle.

11. The system of claim 10, the controller being a computer programmable to open and close the valve at predetermined times during a heating cycle.

12. The system of claim 1, further including an air regulator, a filter/dryer, and a valve positioned in fluid connection between the compressed air source and the distribution manifold.

13. The system of claim 1, the air manifolds being positioned in the heating chamber above the conveyor.

14. A semi-convective oven nozzle for mixing and directing downwardly a combination of compressed air and oven air to convectively heat a sheet of glass on the conveyor, comprising a body having an upper end portion, a lower end portion, and an opening formed in the lower end portion, a compressed air chamber formed in the body, the compressed air chamber having an outlet port, compressed air inlet means formed in the body for introducing compressed air into the compressed air chamber, and oven air conduit means extending through the body and the compressed air chamber for conveying oven air to a location immediately proximate to and downstream of the outlet port of the compressed air chamber, the oven air conduit means having an inlet end portion and an outlet end portion, the outlet port of the compressed air chamber being formed by a gap between the outlet end portion of the oven air conduit means and an insert piece mounted in the opening formed in the lower end portion of the body, the insert piece having a bore extending downwardly therethrough for receiving compressed air from the outlet port of the compressed air chamber and oven air from the oven air conduit means, the bore having a first end portion into which compressed air enters from the compressed air chamber through the outlet port of the compressed air chamber and oven air enters from the oven conduit means through the outlet end of the oven air conduit means, and the bore having a second end portion from which the compressed air and the oven air that enters the bore exits the nozzle, wherein oven air is drawn into and through the oven air conduit means and into the bore in the insert piece in response to compressed air moving through the gap formed between the outlet end portion of the oven air conduit means and the insert piece mounted in the opening formed in the lower end portion of the body, is mixed with the compressed air in the bore, and is expelled from the nozzle from the second end portion of the bore.

15. The nozzle of claim 14, the oven air conduit means having an outer surface, the outer surface of the oven air conduit means at the outlet end portion of the oven air conduit means being angled inwardly to form an inwardly angled outer surface portion, the first end portion of the bore flaring outwardly, and the inwardly angled outer surface portion of the oven air conduit means being aligned next to the first end portion of the bore to define the gap.

16. The nozzle of claim 14, the oven air conduit means comprising an upwardly extending hollow tube, the tube have a length sufficiently long to enable oven air located adjacent to a heating element in the oven to be drawn into the tube when the nozzle is in use in an oven.

17. A semi-convection oven air injector for mixing and injecting downwardly toward a conveyor in an oven an external source of compressed air and oven air to convectively heat a sheet of glass being conveyed through the oven on the conveyor comprising:
- a nozzle means, wherein the nozzle means comprises a body having a compressed air inlet port, an oven air inlet port, and a mixed air outlet port,
- a first conduit having an inlet end and an outlet end, the first conduit extending from the compressed air inlet portion to the mixed air outlet port, and the first conduit having a constricted throat at an intermediate portion, and
- a second conduit having an inlet end and an outlet end, the second conduit extending from the oven air inlet port to the constricted throat, and the second conduit outlet end being coaxial with and located immediately proximate to the constricted throat of the first conduit downstream of the constricted throat, the constricted throat forming a venturi which creates a high pressure region in the first conduit upstream of the constricted throat and a low pressure region in the conduit downstream of the constricted throat,
- wherein oven air is drawn into and through the second conduit into the low pressure region, and is mixed with the compressed air, and is expelled from the mixed air outlet port.

18. A semi-convective forced air system for heating glass sheets during a heating cycle, comprising:
- a heating chamber having a length and a width,
- at least one heating element located within the heating chamber,
- a conveyor having a length and a width, the conveyor extending lengthwise through the heating chamber,
- a compressed air source,
- an air manifold positioned within the heating chamber and in fluid connection with the compressed air source, the air manifold having a length, and the air manifold being oriented parallel to the length of the conveyor, and
- a plurality of nozzle means mounted on the air manifold and in fluid connection with the air manifold for directing a combination of compressed air and oven air toward the conveyor to convectively heat a sheet of glass on the conveyor, the plurality of nozzle means being spaced along the length of the air manifold, each nozzle means comprising a conduit for drawing in oven air, and an outlet port, wherein said oven air and said compressed air are combined in said nozzle means prior to exiting said outlet port.

19. A semi-convective forced air system for heating glass sheets during a heating cycle, comprising:
- a heating chamber having a length and a width,
- at least one heating element located within the heating chamber,
- a conveyor having a length and a width, the conveyor extending lengthwise through the heating chamber,
- a compressed air source,
- a plurality of air manifolds positioned within the heating chamber and in fluid connection with the compressed air source, each of the air manifolds having a length, and each of the air manifolds being oriented parallel to the length of the conveyor,
- a plurality of nozzle means mounted on each air manifold and in fluid connection with the air manifold for mixing together and directing toward the conveyor a combination of compressed air and oven air to convectively heat a sheet of glass on the conveyor, the plurality of nozzle means on each air manifold being spaced along the length of the air manifold,
- wherein the nozzle means comprises a body having an upper end portion, a lower end portion, and an opening formed in the lower end portion,
- a compressed air chamber formed in the body, the compressed air chamber having an outlet port,
- compressed air inlet means formed in the body for introducing compressed air into the compressed air chamber, and
- oven air conduit means extending through the body and the compressed air chamber for conveying oven air to a location immediately proximate to and downstream of the outlet port of the compressed air chamber, the oven air conduit means having an inlet end portion and an outlet end portion,
- the outlet port of the compressed air chamber being formed by a gap between the outlet end portion of the oven air conduit means and an insert piece mounted in the opening formed in the lower end portion of the body, the insert piece having a bore extending downwardly therethrough for receiving compressed air from the outlet port of the compressed air chamber and oven air from the oven air conduit means, the bore having a first end portion into which compressed air enters from the compressed air chamber through the outlet port of the compressed air chamber and oven air enters from the oven conduit means through the outlet end of the oven air conduit means, and the bore having a second end portion from which the compressed air and the oven air that enters the bore exits the nozzle,
- wherein oven air is drawn into and through the oven air conduit means and into the bore in the insert piece in response to compressed air moving through the gap formed between the outlet end portion of the oven air conduit means and the insert piece mounted in the opening formed in the lower end portion of the body, is mixed with the compressed air in the bore, and is expelled from the nozzle from the second end portion of the bore.

20. The system of claim 19, the oven air conduit means having an outer surface,
- the outer surface of the oven air conduit means at the outlet end portion of the oven air conduit means being angled inwardly to form an inwardly angled outer surface portion,
- the first end portion of the bore flaring outwardly, and
- the inwardly angled outer surface portion of the oven air conduit means being aligned next to the first end portion of the bore to define the gap.

21. The system of claim 19, the oven air conduit means comprising an upwardly extending hollow tube,
- the tube have a length sufficiently long to enable oven air located adjacent to a heating element in the oven to be drawn into the tube when the nozzle is in use in an oven.

22. The system of claim 19, each manifold being segmented into a plurality of segments, with each segment being connected to the compressed air source, with each segment being oriented parallel to the length of the conveyor, and with each segment having at least one nozzle means mounted therein.

23. The system of claim 22, further including
a distribution manifold in fluid connection with the compressed air source and each manifold segment,
a valve and a flow meter in fluid connection with the distribution manifold, and
a controller connected to the compressed air source for controlling how much compressed air is supplied to selected manifold segments at predetermined times during a heating cycle.

24. The system of claim 23, the controller being a computer programmable to open and close the valve at predetermined times during a heating cycle.

25. A semi-convective forced air system for heating glass sheets during a heating cycle, comprising:
a heating chamber having a length and a width,
at least one heating element located within the heating chamber,
a conveyor having a length and a width, the conveyor extending lengthwise through the heating chamber,
a compressed air source,
a plurality of air manifolds positioned within the heating chamber and in fluid connection with the compressed air source, each of the air manifolds having a length, and each of the air manifolds being oriented parallel to the length of the conveyor, and
a plurality of nozzle means mounted on each air manifold and in fluid connection with the air manifold for mixing together and directing toward the conveyor a combination of compressed air and oven air to convectively heat a sheet of glass on the conveyor, the plurality of nozzle means on each air manifold being spaced along the length of the air manifold,
each nozzle means having an upper end portion for drawing in oven air located adjacent to the heating element into the nozzle.

26. A semi-convective forced air system for heating glass sheets during a heating cycle, comprising:
a heating chamber having a length and a width,
at least one heating element located within the heating chamber,
a conveyor having a length and a width, the conveyor extending lengthwise through the heating chamber,
a compressed air source,
a plurality of air manifolds positioned within the heating chamber and in fluid connection with the compressed air source, each of the air manifolds having a length, and each of the air manifolds being oriented parallel to the length of the conveyor, and
a plurality of nozzle means mounted on each air manifold and in fluid connection with the air manifold for mixing together and directing toward the conveyor a combination of compressed air and oven air to convectively heat a sheet of glass on the conveyor, the plurality of nozzle means on each air manifold being spaced along the length of the air manifold,
each nozzle means being positioned in the oven such that oven air located adjacent to the heating element is drawn into the nozzle.

* * * * *